(12) United States Patent
Tatake et al.

(10) Patent No.: US 11,533,578 B2
(45) Date of Patent: Dec. 20, 2022

(54) VIRTUAL ENVIRONMENT AUDIO STREAM DELIVERY

(71) Applicant: Microsoft Technology Licensing, LLC, Redmond, WA (US)

(72) Inventors: Ashutosh Vidyadhar Tatake, Seattle, WA (US); Noel Richard Cross, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 17/185,790

(22) Filed: Feb. 25, 2021

(65) Prior Publication Data
US 2022/0272478 A1    Aug. 25, 2022

(51) Int. Cl.
*H04S 7/00*       (2006.01)
*G10L 25/21*      (2013.01)
*H04S 3/00*       (2006.01)

(52) U.S. Cl.
CPC .............. *H04S 7/303* (2013.01); *G10L 25/21* (2013.01); *H04S 3/008* (2013.01); *H04S 2400/01* (2013.01); *H04S 2400/11* (2013.01)

(58) Field of Classification Search
None
See application file for complete search history.

(56) References Cited

U.S. PATENT DOCUMENTS 6,559,863 B1      5/2003  Megiddo
6,744,882 B1 *    6/2004  Gupta ................ H04M 1/6016
                                                                381/104
7,346,654 B1 *    3/2008  Weiss ....................... H04N 7/15
                                                              348/E7.083
8,718,285 B2 *    5/2014  Ishikawa ........... H04L 12/40013
                                                                381/310
9,282,196 B1 *    3/2016  Norris ............... H04M 3/53366
2007/0237099 A1* 10/2007  He ...................... H04L 67/1061
                                                                370/260

(Continued)

FOREIGN PATENT DOCUMENTS

GB      2349055 A    10/2000
WO      9733450 A1    9/1997

OTHER PUBLICATIONS

"International Search Report and Written Opinion Issued in PCT Application No. PCT/US22/013966", dated May 9, 2022, 14 Pages.

*Primary Examiner* — Qin Zhu
(74) *Attorney, Agent, or Firm* — Alleman Hall Creasman & Tuttle LLP

(57) ABSTRACT

At a collaboration computing device, a method for selecting a subset of audio streams for delivery to a client device includes receiving a plurality of audio streams from a plurality of source devices, each source device associated with a different spatial position within a virtual environment. For each audio stream, the collaboration computing device determines a source audio energy value and computes a client-centric audio energy value by modifying the source audio energy value using a corresponding source attenuation value associated with the source device that transmitted the audio stream. The collaboration computing device generates a source prioritization list by sorting the plurality of source devices by their client-centric audio energy values. A subset of the audio streams are selected and delivered to the client device.

20 Claims, 11 Drawing Sheets

(56) References Cited

U.S. PATENT DOCUMENTS

| | | | |
|---|---|---|---|
| 2011/0044474 A1* | 2/2011 | Grover | H04M 3/40 |
| | | | 379/202.01 |
| 2015/0373477 A1* | 12/2015 | Norris | H04M 1/6033 |
| | | | 381/303 |
| 2016/0021151 A1* | 1/2016 | Bain | H04L 65/1006 |
| | | | 379/93.01 |
| 2016/0183003 A1* | 6/2016 | Bender | H04R 5/033 |
| | | | 381/309 |
| 2020/0084564 A1 | 3/2020 | Mindlin et al. | |

* cited by examiner

SRMS VALUES 500

| Source ID | Source Audio Energy Value |
| --- | --- |
| S1 | 7.6 dB |
| S2 | 3.5 dB |
| S3 | 1.3 dB |
| S4 | 9.4 dB |
| ... | ... |
| S40 | 5.0 dB |

FIG. 5

CLIENT-CENTRIC AUDIO ENERGY VALUES FOR LISTENER 3 (SOURCE 3)

| Source ID | Client-Centric AEV |
| --- | --- |
| S1 | 0.23 * 7.6 dB = 1.75 |
| S2 | 0.94 * 3.5 dB = 3.29 |
| S4 | 0.76 * 9.4 dB = 7.14 |
| S5 | 0.03 * 8.0 dB = 0.24 |
| ... | ... |
| S40 | 0.51 * 5.0 dB = 2.55 |

FIG. 6

AUDIO STREAM SUBSET (SOURCE 3) 700

| Source ID | Audio Stream |
|---|---|
| S1 | S1 audio stream |
| S7 | S7 audio stream |
| S36 | S36 audio stream |
| S24* | S24 audio stream* |
| S13 | S13 audio stream |

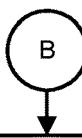

WHEREIN EACH SOURCE ATTENUATION VALUE OF THE PLURALITY OF SOURCE ATTENUATION VALUES IS BASED ON A DISTANCE IN THE VIRTUAL ENVIRONMENT BETWEEN A CLIENT DEVICE SPATIAL POSITION ASSOCIATED WITH THE CLIENT DEVICE AND A SOURCE DEVICE SPATIAL POSITION ASSOCIATED WITH THE SOURCE DEVICE
816

WHEREIN EACH SOURCE ATTENUATION VALUE OF THE PLURALITY OF SOURCE ATTENUATION VALUES IS ALSO BASED ON ONE OR MORE VIRTUAL ACOUSTIC FACTORS ASSOCIATED WITH THE VIRTUAL ENVIRONMENT
818

WHEREIN EACH SOURCE ATTENUATION VALUE OF THE PLURALITY OF SOURCE ATTENUATION VALUES IS BASED ON A DISTANCE BETWEEN A CORRESPONDING SOURCE DEVICE OF THE PLURALITY OF SOURCE DEVICES AND A VIRTUAL ANCHOR IN THE VIRTUAL ENVIRONMENT
820

WHEREIN THE SOURCE AUDIO ENERGY VALUE IS A SOURCE ROOT-MEAN-SQUARE (SRMS) VALUE, AND ACCESSING THE SOURCE AUDIO ENERGY VALUE FURTHER COMPRISES RECEIVING THE SRMS VALUE FROM THE SOURCE DEVICE THAT TRANSMITTED THE AUDIO STREAM
822

WHEREIN COMPUTING THE CLIENT-CENTRIC AUDIO ENERGY VALUE COMPRISES MULTIPLYING THE SOURCE AUDIO ENERGY VALUE BY THE SOURCE ATTENUATION VALUE ASSOCIATED WITH THE SOURCE DEVICE THAT TRANSMITTED THE AUDIO STREAM
824

WHEREIN SORTING THE PLURALITY OF SOURCE DEVICES BY THEIR CLIENT-CENTRIC AUDIO ENERGY VALUES COMPRISES SORTING THE PLURALITY OF SOURCE DEVICES FROM A HIGHEST CLIENT-CENTRIC AUDIO ENERGY VALUE TO A LOWEST CLIENT-CENTRIC AUDIO ENERGY VALUE
826

902 RECEIVE ONE AUDIO STREAM OF A PLURALITY OF AUDIO STREAMS FROM EACH CLIENT COMPUTING DEVICE OF A PLURALITY OF CLIENT COMPUTING DEVICES, EACH CLIENT COMPUTING DEVICE ASSOCIATED WITH A DIFFERENT SPATIAL POSITION WITHIN A VIRTUAL ENVIRONMENT

904 ACCESS A PLURALITY OF SOURCE ATTENUATION VALUES FOR EACH OF THE CLIENT COMPUTING DEVICES, WHEREIN EACH SOURCE ATTENUATION VALUE OF THE PLURALITY OF SOURCE ATTENUATION VALUES REPRESENTS A DISTANCE IN THE VIRTUAL ENVIRONMENT BETWEEN A PAIR OF THE CLIENT COMPUTING DEVICES

FOR EACH AUDIO STREAM OF THE PLURALITY OF AUDIO STREAMS:

906 ACCESS A SOURCE AUDIO ENERGY VALUE AT THE CLIENT COMPUTING DEVICE THAT TRANSMITTED THE AUDIO STREAM

908 COMPUTE A CLIENT-CENTRIC AUDIO ENERGY VALUE BY MODIFYING THE SOURCE AUDIO ENERGY VALUE USING A CORRESPONDING SOURCE ATTENUATION VALUE OF THE PLURALITY OF SOURCE ATTENUATION VALUES, THE CORRESPONDING SOURCE ATTENUATION VALUE ASSOCIATED WITH THE CLIENT COMPUTING DEVICE THAT TRANSMITTED THE AUDIO STREAM

FOR EACH CLIENT COMPUTING DEVICE:

910 GENERATE A SOURCE PRIORITIZATION LIST BY SORTING AT LEAST A PORTION OF THE PLURALITY OF CLIENT COMPUTING DEVICES BY THEIR CLIENT-CENTRIC AUDIO ENERGY VALUES

912 SELECT A SUBSET OF AUDIO STREAMS FROM THE SOURCE PRIORITIZATION LIST

914 DELIVER THE SUBSET OF AUDIO STREAMS TO THE CLIENT DEVICE

FIG. 9

VIRTUAL ENVIRONMENT AUDIO STREAM DELIVERY

BACKGROUND

A plurality of networked computing devices may each render a shared virtual environment for display to users of the computing devices, where each computing device corresponds to a different spatial position within the virtual environment. Each computing device may receive one or more audio streams originating from other computing devices of the plurality, where each audio stream may correspond to, for example, audible speech of the users of the other computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one example, at a collaboration computing device, a method for selecting a subset of audio streams for delivery to a client device includes receiving a plurality of audio streams from a plurality of source devices, each source device associated with a different spatial position within a virtual environment. For each audio stream, the collaboration computing device accesses a source audio energy value at the source device that transmitted the audio stream, and computes a client-centric audio energy value by modifying the source audio energy value using a corresponding source attenuation value associated with the source device that transmitted the audio stream. The collaboration computing device generates a source prioritization list by sorting the plurality of source devices by their client-centric audio energy values. A subset of the audio streams are selected and delivered to the client device.

BRIEF DESCRIPTION OF THE DRAWINGS

FIG. 5 shows an example list of source audio energy values.

FIG. 6 shows an example list of client-centric audio energy values.

FIG. 7 shows a subset of audio streams selected for a user computing device.

FIGS. 8A-8C show a flow diagram of a method for selecting a subset of audio streams from a plurality of audio streams for delivery to a client device.

FIG. 9 shows a flow diagram of a method for delivering different subsets of audio streams from a plurality of audio streams to client computing devices.

DETAILED DESCRIPTION

Figure 1:
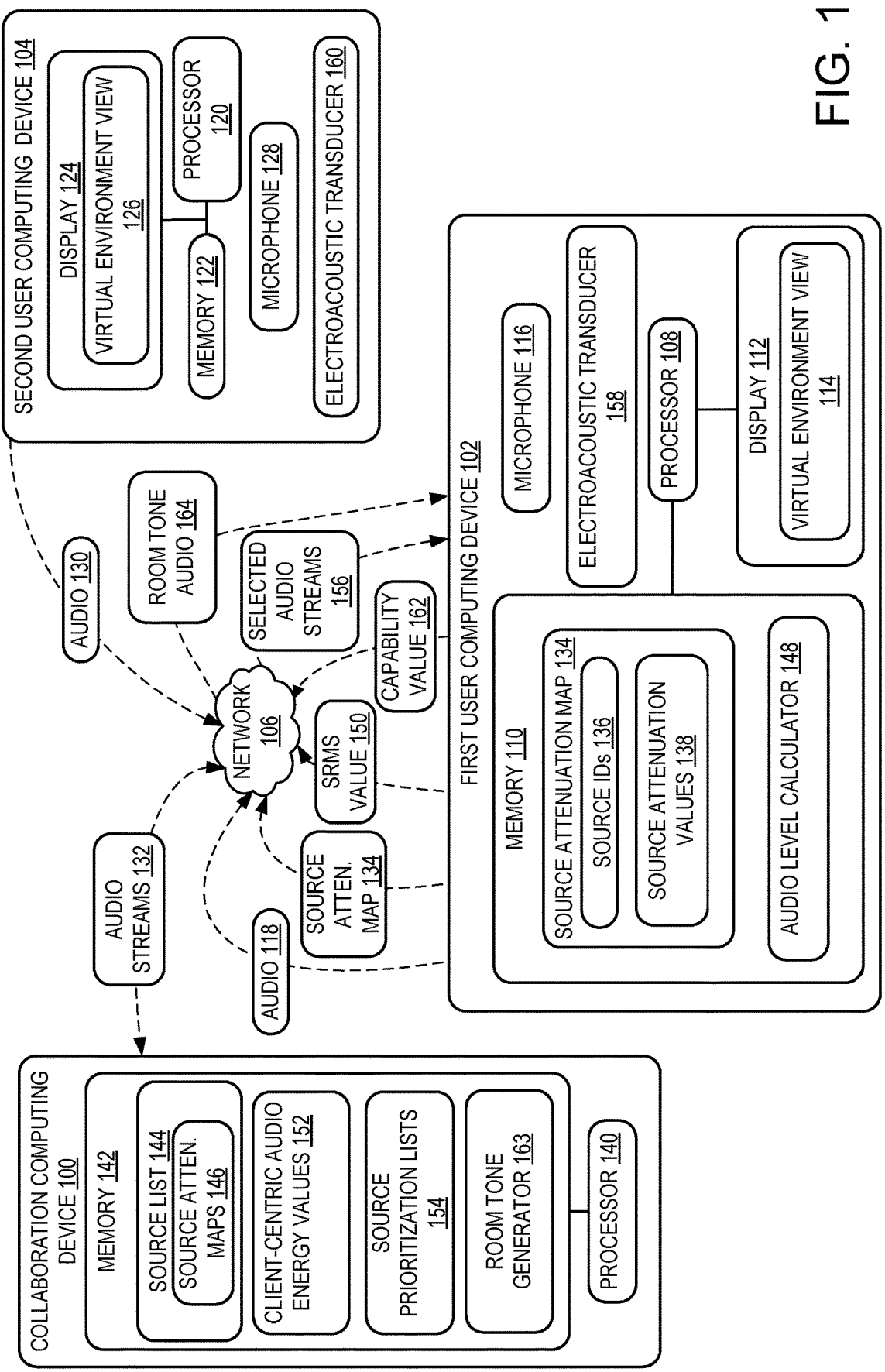
FIG. 1 schematically shows a collaboration computing device and first and second user computing devices exchanging data over a network.

When multiple users participate in a shared virtual environment, it is often desirable for each user's computing device to receive audio streams originating from other user computing devices. For example, a user computing device may receive a user's speech at a microphone, encode such speech as an audio stream, and transmit the audio stream to a server for distribution to other user computing devices so that the user's speech can be heard by other users. This can help to replicate the experience of in-person conversation or collaboration in virtual settings, enabling users to communicate in a virtual environment even if they are not physically present in the same real-world environment.

However, as the number of user computing devices participating in the virtual environment increases, it becomes increasingly difficult for every user computing device to receive audio streams from every other user computing device. Rather, when relatively larger numbers of audio streams are transmitted, the streams consume larger amounts of network bandwidth between the server and user computing devices, which can prohibitively degrade network performance. Furthermore, processing larger numbers of audio streams at the server and user computing devices also increases the computational workloads at these devices, particularly when audio spatialization techniques are used to improve auditory separation. This is compounded by the fact that different types of user computing devices will often have different processing capabilities. Thus, user computing devices with relatively weaker computational hardware may be unable to participate in certain virtual experiences if too many other devices are transmitting audio.

In some examples, to reduce network bandwidth and computational demands, the number of audio streams received by each user computing device is capped to a fixed number. However, this can negatively impact the user experience—for example, when a first user is prevented from communicating with a second user because the first user's computing device is already receiving its maximum number of audio streams.

Accordingly, the present disclosure is directed to techniques for implementing an efficient and listener-centric system for selecting per-listener, prioritized subsets of audio streams originating from other user computing devices. Specifically, according to the present disclosure, a plurality of user computing devices, each associated with different spatial positions within a virtual environment (such as the spatial position of an avatar), transmit audio streams to a collaboration computing device—e.g., a server. Each user computing device further transmits a plurality of source attenuation values to the collaboration computing device. "Attenuation" refers to a reduction in sound energy over distance. In some examples, each source attenuation value indicates a distance between the spatial position associated with the user computing device within the virtual environment, and the spatial position of a different user computing device within the virtual environment. Thus, a "source attenuation value" provides a way to compute a reduction in sound energy over a specific distance—e.g., between effective positions of two user computing devices within a virtual environment. In other words, for a particular user computing device referred to as a "client device," each source attenuation value is calculated based on the distance within the virtual environment between spatial positions associated with the client device and another user computing device transmitting an audio stream, referred to as a "source device." In this manner, the source attenuation value can be used to simulate a reduction in the audio intensity of the audio stream provided by the source device based on the distance between the source device and the client device. In other examples, each source attenuation value is based on a distance between a corresponding source device and a virtual anchor in the virtual environment, such as a virtual microphone.

Focusing now on a particular client device, the collaboration computing device computes "client-centric audio energy values" based on the source attenuation values provided by the client device and a source audio energy value for each audio stream received at the collaboration computing device. In some examples the source audio energy value can be a source root-mean-square (SRMS) value received from the source device that transmitted the audio stream. A client-centric audio energy value can be described as the effective intensity of an audio stream originating from a source device and received by the client device, where the effective intensity is based on the original intensity of the audio stream at the source device and the distance between spatial positions corresponding to the source and client devices in the virtual environment. After computing client-centric audio energy values for each audio stream, the collaboration computing device sorts the plurality of source devices by the client-centric audio energy values of their corresponding audio streams to generate a source prioritization list. A subset of audio streams is then requested by stream ID from the source prioritization list and delivered to the client device.

In some examples, different user computing devices may receive a different number of audio streams, based on each device's respective hardware capabilities and/or available network bandwidth. In other words, the number of audio streams selected as the "subset of audio streams" may be higher for devices having relatively more powerful processing hardware and/or plentiful network bandwidth, and lower for devices having relatively less powerful processing hardware and/or more restricted network bandwidth. In other examples, however, each user computing device may receive the same number of audio streams. In any case, the techniques described herein provide listener-centric subsets of audio streams for more realistic audio experiences in shared virtual environments, while also mitigating excessive computational load and network bandwidth consumption at each user computing device, as well as reducing computational load on the collaboration computing device.

FIG. 1 schematically depicts an example collaboration computing device 100, along with a first user computing device 102 and a second user computing device 104 exchanging data over a network 106. While only two user computing devices are shown in FIG. 1, it will be understood that the techniques described herein may be applied to any suitable number of different user computing devices participating in a shared virtual environment, including dozens, hundreds, or thousands of different user computing devices.

The collaboration computing device 100, first user computing device 102, and second user computing device 104 may each have any suitable hardware configuration, form factor, and processing capabilities. In one example scenario, the collaboration computing device 100 may be a server computing system. The first and second user computing devices 102, 104 may be any types of personal devices capable of rendering and displaying some representation of a shared virtual environment. For example, the first user computing device 102 may be a mixed reality device, such as a virtual or augmented reality device taking the form of a head-mounted display (HMD). The second user computing device 104 may be a different type of personal computing device having relatively weaker processing capabilities than the first user computing device—e.g., a smartphone or tablet computer.

In general, however, the collaboration computing device 100, first user computing device 102, and second user computing device 104 may each take any suitable form. As non-limiting examples, any or all of the devices may be implemented as smartphones, tablets, laptops, desktop computers, mixed reality devices, media centers, servers, wearable devices, or fitness devices. Any or all of the collaboration computing device 100 and first and second user computing devices 102, 104 may be implemented as computing system 1000 described below with respect to FIG. 10.

Network 106 may take the form of any suitable computer network and may be implemented via any suitable combination of computer networking devices. In various examples, network 106 may be implemented as a local computer network, or a wide-area network such as the Internet. Computing devices exchanging data over the network may be communicatively coupled using any suitable combination of wired and/or wireless connections.

Continuing with FIG. 1, first user computing device 102 includes a processor 108 and a memory 110. Processor 108 may take the form of any suitable computer logic componentry. In one example, processor 108 may be implemented as logic subsystem 1002 described below with respect to FIG. 10. Similarly, memory 110 may take the form of any suitable volatile or non-volatile computer storage medium. Memory 110 may be implemented as storage subsystem 1010 described below with respect to FIG. 10. Memory 110, and/or other storage media of the first user computing device, may hold computer instructions executable by processor 108 to perform various computing functions and some or all of the methods and processes described herein.

For example, first user computing device 102 includes a display 112. By executing computer instructions held by memory 110, processor 108 may render visual content for presentation on display 112. In the example of FIG. 1, such visual content includes a view 114 of a virtual environment rendered by first user computing device 102. In other words, the first user computing device renders and displays a particular view of a larger virtual environment, based on a spatial position within the virtual environment that the first user computing device is associated with. More details regarding an exemplary virtual environment will be provided below with respect to the example illustrated in FIGS. 2A, 2B, and 3.

Display 112 may take the form of any type of computer display suitable for presenting visual content rendered by processor 108. In the case where the first user computing device is a mixed reality device, display 112 may take the form of a near-eye display of an HMD. In other examples, however, the display may take any other suitable form. As non-limiting examples, display 112 may be a computer monitor, television, projector system, or integrated display (e.g., smartphone, laptop, or tablet display). Display 112 may be implemented as display subsystem 1006 described below with respect to FIG. 10.

Figure 2A:
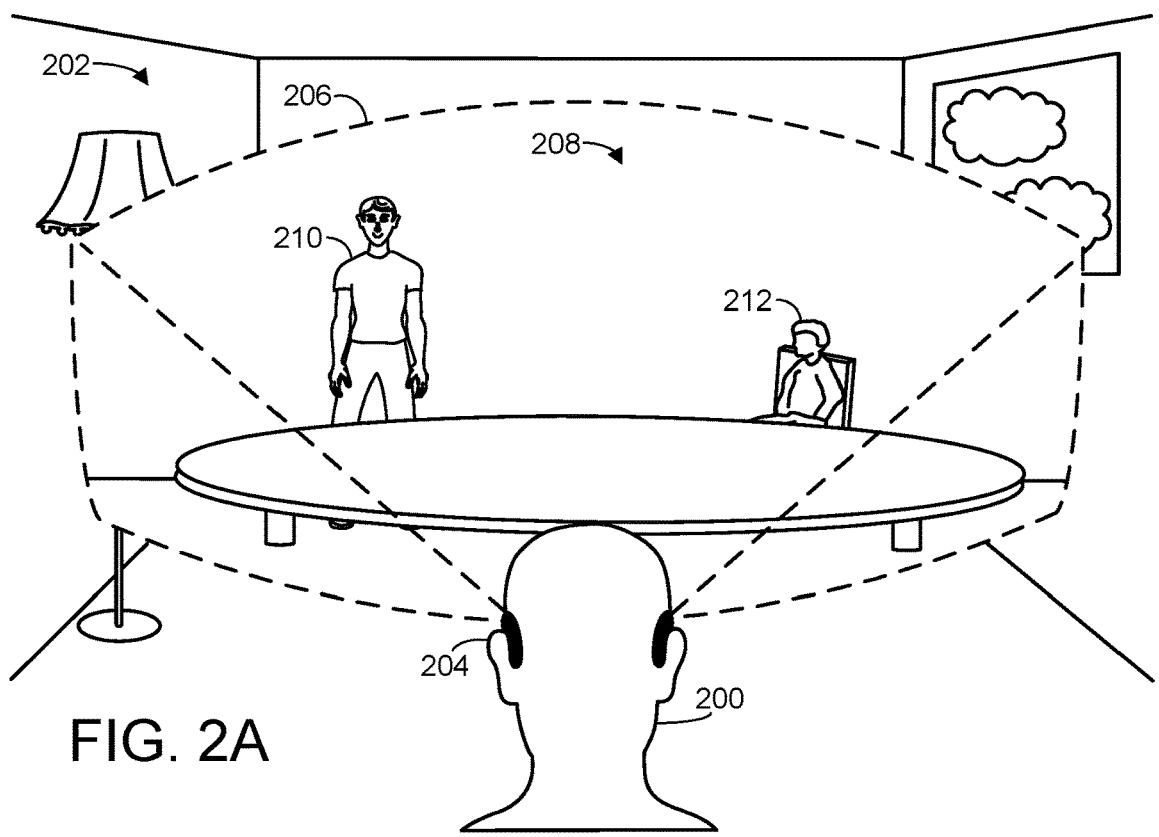
FIG. 2A illustrates use of a user computing device to view a virtual environment.

Turning now to FIG. 2A, a user 200 is depicted within a real-world environment 202. User 200 is equipped with a mixed reality device 204 taking the form of an HMD having a near-eye display. In one example, first user computing device 102 of FIG. 1 may be implemented as mixed reality device 204. Via the near-eye display, user 200 has a field-of-view 206 of a virtual environment 208. The virtual environment is presented as a series of virtual image frames displayed to the eyes of the user via the near-eye display, such that the user's view of their surrounding real-world environment is partially, or entirely, replaced by virtual content.

In this example, the near-eye display is substantially opaque, meaning the user's view of real-world environment 202 is substantially replaced with a view of virtual environment 208. Thus, user 200 has a view of a virtual conference table, chair, and two user avatars 210, 212 that are not present in the user's actual surroundings. In other examples, however, the near-eye display may be at least partially transparent, allowing the user to retain at least some visibility of their surrounding real-world environment. For example, mixed reality device 204 may be an augmented reality device that renders virtual content (e.g., avatars representing other users) in such a way that the virtual content appears to exist in the same real-world environment as the user. It will be understood that the audio stream delivery techniques described herein may be implemented regardless of how the virtual environment is presented to the user.

As shown, virtual environment 208 includes two avatars 210 and 212 representing additional users that that are not present in the same real-world environment 202 as user 200. Rather, the users corresponding to avatars 210 and 212 may be present in different real-world environments from user 200 (e.g., different rooms, buildings, cities, or countries), while still participating in the same shared virtual environment. For example, the users corresponding to avatars 210 and 212 may each be presented with different views of the virtual environment via their own corresponding user computing devices, such as second user computing device 104 of FIG. 1.

As described further below, user 200 also may have an avatar representing the user in the virtual environment 208. The positions of this user's avatar and those of other users within the virtual environment 208 may be tracked in any suitable way. For example, mixed reality device 204 may be equipped with suitable motion sensors or position sensors (e.g., an inertial measurement unit and/or a camera array) configured to track the movements of the mixed reality device within real-world environment 202. Additionally, or alternatively, a user may change the spatial position associated with their user computing device in the virtual environment in other suitable ways. For example, the user may change their spatial position by manipulating a suitable input device, such as a computer mouse/keyboard, video game controller, touch screen, trackpad, or gestural interface.

In any case, based on suitable user input, the mixed reality device 204 may update its spatial position corresponding to the virtual environment, and transmit some indication of its updated spatial position to the collaboration computing device and/or other user computing devices—e.g., as a set of coordinates relative to a shared coordinate system associated with the virtual environment. Each user computing device may also receive, from the collaboration computing device and/or other user computing devices, indications of the spatial positions within the virtual environment that the other user computing devices are associated with, so that avatars corresponding to the user computing devices can be presented at appropriate positions within the virtual environment.

Figure 2B:
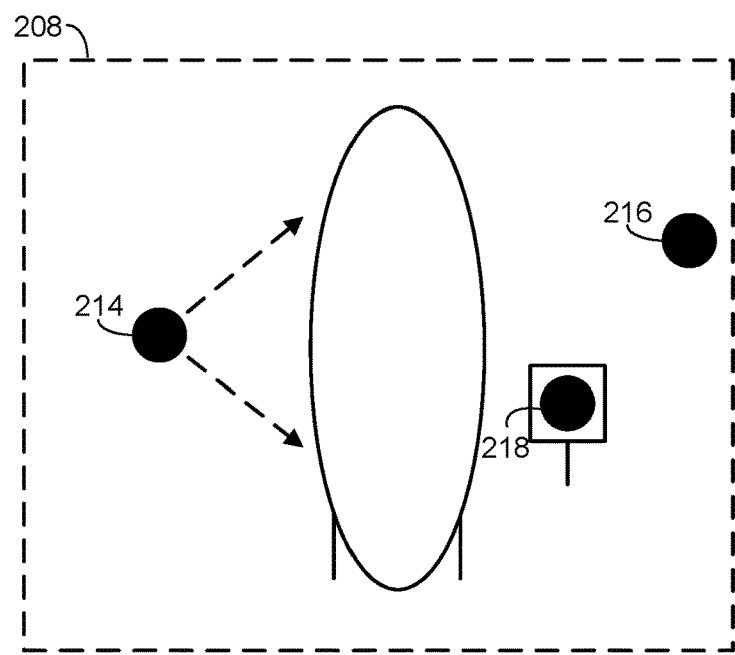
FIG. 2B illustrates a spatial position within the virtual environment corresponding to the user computing device of FIG. 2A.

FIG. 2B shows a different view of a portion of virtual environment 208, this time from a simplified, top-down perspective. Mixed reality device 204 and its corresponding avatar are associated with a spatial position 214 within virtual environment 208, denoted in FIG. 2B by a black circle. In other words, the mixed reality device may render a view of the virtual environment for presentation to user 200 as if the user was standing at position 214 within environment 208. The dashed arrows extending away from position 214 indicate the edges of the user's field of view 206, extending toward the virtual conference table. Additional spatial positions 216 and 218 are also shown, indicating the positions of avatars 210 and 212 (associated with two other users and their computing devices) within the virtual environment.

As discussed above, different user computing devices used to view and participate in a shared virtual environment may have different form factors and hardware configurations. Thus, the view of the virtual environment presented to each different user may differ from one device to another. For example, some users participating in the virtual environment may be equipped with mixed reality devices, similar to mixed reality device 204. Such users may therefore be presented with "first-person" views of the virtual environment, similar to the view depicted in FIG. 2A. Additionally, or alternatively, users participating in the shared virtual environment may use devices having other capabilities and/or form factors, and may be presented with different views. As a non-limiting example, any or all of the users participating in the virtual environment may be presented with "third-person" views, similar to the one shown in FIG. 2B. In general, any given user may be presented with any suitable view of the virtual environment, depending on the type of virtual environment they are participating in, the type of device they are using, their own preferences, and/or any other considerations. It will be understood that the audio stream delivery techniques described herein may be applied regardless of how the virtual environment is presented to the various users.

Figure 3:
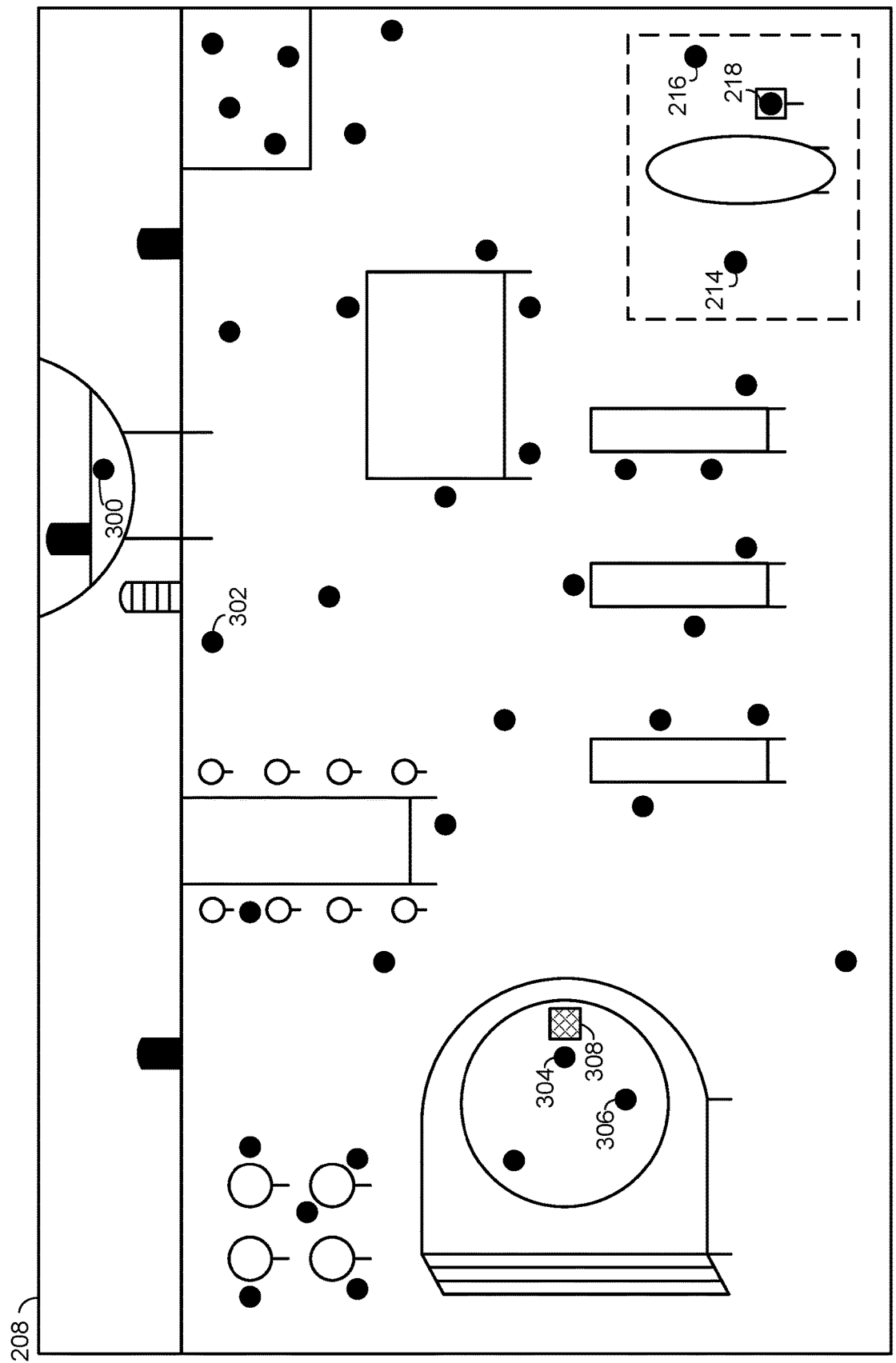
FIG. 3 illustrates spatial positions of a plurality of user computing devices within the virtual environment of FIGS. 2A and 2B.

Turning now to FIG. 3, a larger view of virtual environment 208 is shown, again using a simplified, top-down perspective. The portion of the virtual environment depicted in FIG. 2B is shown within a dashed box for reference. As shown in FIG. 3, a number of additional users are also participating in the shared virtual environment. This is indicated by the various black circles shown within virtual environment 208, each representing a spatial position associated with a different user computing device. A total of forty different spatial positions are shown within virtual environment 208, corresponding to forty different users. It will be understood, however, that forty users is a non-limiting example, and that any suitable number of users may simultaneously participate in a shared virtual environment—e.g., dozens, hundreds, or thousands of different users.

As discussed above, it is often desirable for users participating in a shared virtual environment to communicate with one another. To this end, each user computing device may be configured to transmit an audio stream encoding a respective user's speech to the collaboration computing device, for distribution to one or more other user computing devices.

This is schematically illustrated in more detail with respect to FIG. 1. As shown, first user computing device 102 includes a microphone 116 configured to record sounds in the vicinity of the first user computing device, where such sounds may include user speech. The first user computing device is configured to encode the sounds received at the microphone and transmit them to collaboration computing device 100 over network 106 as an audio stream 118.

The second user computing device may similarly send an audio stream to the collaboration computing device. As with the first user computing device, second user computing device 104 includes a processor 120 and a memory 122. By executing instructions held by memory 122, processor 120 renders a view 126 of the virtual environment for presentation on a display 124. Notably, view 126 rendered by processor 120 differs from view 114 rendered by processor 108, as the first and second computing devices are associated with different spatial positions within the virtual environment.

Processor 120 may take the form of any suitable computer logic componentry. In one example, processor 120 may be implemented as logic subsystem 1002 described below with respect to FIG. 10. Similarly, memory 122 may take the form of any suitable volatile or non-volatile computer storage medium. Memory 122 may be implemented as storage subsystem 1010 described below with respect to FIG. 10. Display 124 may utilize any suitable type of display technology, and may be implemented as display system 1006 described below with respect to FIG. 10.

Second user computing device 104 also includes a microphone 128. Just as with microphone 116, microphone 128 is configured to receive sounds in the vicinity of second user computing device 104, where such sounds may include human speech from a user of the second user computing device. Second user computing device 104 is configured to encode the sounds received by microphone 128 and transmit them to collaboration computing device 100 over network 106 as an audio stream 130.

Continuing with FIG. 1, collaboration computing device 100 receives a plurality of audio streams 132 (including audio streams 118 and 130) from a plurality of different source devices, including at least the first and second user computing devices 102 and 104. As discussed above, each source device is associated with a different spatial position within a virtual environment—e.g., virtual environment 208. As will be described in more detail below, the collaboration computing device may select, for each of the user computing devices, a subset of the plurality of audio streams for delivery.

As noted above, such selections are based at least on a plurality of source attenuation values. Focusing on first user computing device 102, also referred to as a "client device," the device maintains a source attenuation map 134 within memory 110. The source attenuation map includes a plurality of source IDs 136 that identify the source devices sending audio streams to the collaboration computing device. The source IDs may be received by the client device from the collaboration computing device, and/or received directly from each of the individual source devices. The source attenuation map 134 further includes a plurality of source attenuation values 138, each associated with a different source device.

Figure 4:
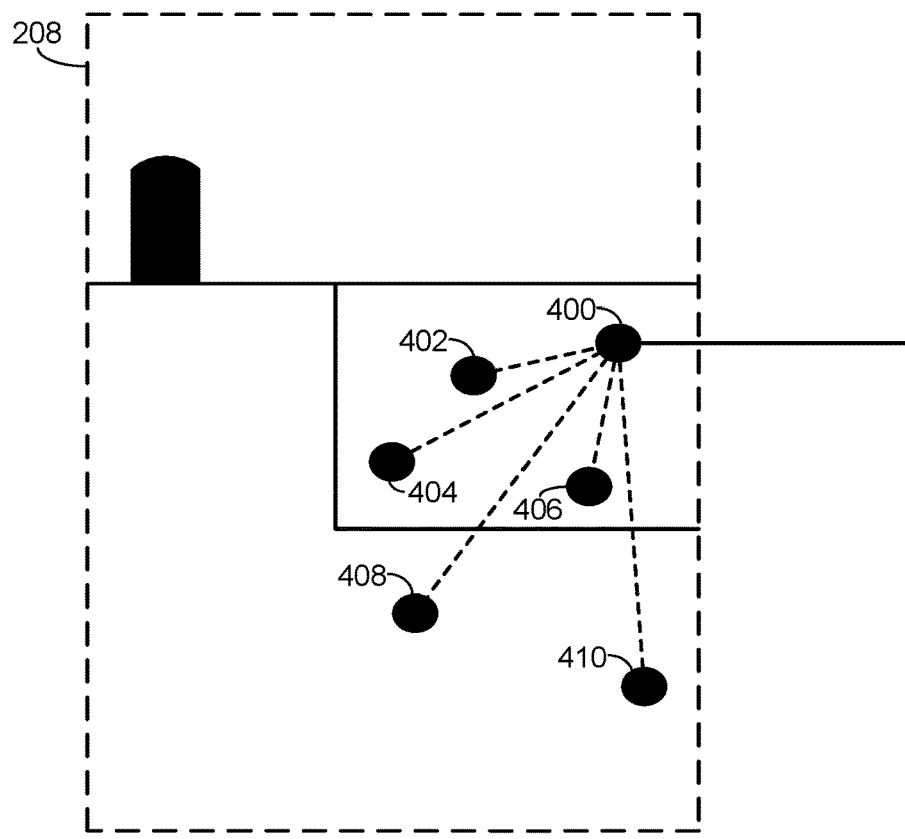
FIG. 4 shows an example source attenuation map including a plurality of source attenuation values for a user computing device.

In some examples, each of the source attenuation values is based on a distance in the virtual environment between a client device spatial position associated with the client device and a source device spatial position associated with a corresponding source device of the plurality of source devices. This is schematically illustrated with respect to FIG. 4, which focuses on a different portion of virtual environment 208, again using the same simplified, top-down view as FIGS. 2B and 3. FIG. 4 depicts several spatial positions 400, 402, 404, 406, 408, and 410, each associated with different user computing devices sending audio streams to the collaboration computing device. Source attenuation values will be described with respect to the user computing device associated with spatial position 400 which, for the purposes of this example, is referred to as the "client device."

From the perspective of the client device, the user computing devices associated with spatial positions 402, 404, 406, 408, and 410 are "source devices," as they are transmitting audio streams that may ultimately be delivered to the client device. The client device may also transmit an audio stream to the collaboration computing device, which may ultimately be delivered to one or more of the devices associated with positions 402, 404, 406, 408, and 410. In other words, from the perspective of any given user computing device, every other user computing device is a source device. Thus, each different user computing device has a source ID. In the example of FIG. 4, the client device has a source ID of S3, or "source 3."

FIG. 4 includes several dashed lines extending between the spatial positions associated with the client device and the various source devices, indicating the relative distances between the spatial positions associated with each pair of devices. Based on these distances, the client device generates a source attenuation map 412. The source attenuation map includes, for each source ID, a source attenuation value (SAV) between the client device (i.e., "source 3") and a source device corresponding to the source ID. Though only 5 source devices are shown in the portion of virtual environment 208 reproduced in FIG. 4, the source attenuation map includes source attenuation values between the client device and every other user computing device participating in the shared virtual environment.

A user computing device may calculate a source attenuation value in any suitable way based on the distance between two spatial positions in a virtual environment. Notably, as will be described in more detail below, source attenuation values are used to attenuate the intensity of audio streams, to emulate decay of an actual sound wave traveling through the real world. In some cases, a source attenuation value may take the form of a scalar having a magnitude of between minimum and maximum values, such as zero and one. Thus, an audio energy value at a source device may be attenuated by multiplying the audio energy value by a corresponding source attenuation value associated with a given client device. As such, source attenuation values relatively closer to zero, when applied to an audio energy value (e.g., via multiplication), will result in more attenuation of the intensity of the audio stream. In other words and in some examples, the magnitude of each source attenuation value may be inversely proportional to the distance between the spatial positions of a given client and source device. In general, however, a source attenuation value may take any suitable form, and in some cases the magnitude of a source attenuation value may be proportional to the distance between the two spatial positions of a client and source device.

The distance between two spatial positions in a virtual environment may be measured in any suitable way. As discussed above, each user computing device may have information regarding the spatial positions associated with other user computing devices participating in the shared virtual environment. Thus, each user computing device may generate its set of source attenuation values by comparing the virtual coordinates of its own spatial position to the virtual coordinates of spatial positions associated with the other user computing devices. It will be understood that the specific source attenuation values shown in source attenuation map 412 are non-limiting examples.

In alternative implementations, source attenuation values may be calculated by the collaboration computing device in addition to, or instead of, being calculated at the user computing devices. For example, the collaboration computing device may have information regarding the spatial positions within the virtual environment associated with each of the plurality of user computing devices. Thus, the collaboration computing device may determine the virtual distances between the spatial positions of each pair of user computing devices, and thereby calculate source attenuation values for each client device. In other words, the collaboration computing device may be configured to calculate source attenuation values for each of the plurality of client devices, wherein each source attenuation value of the plurality of source attenuation values represents a distance in the virtual environment between a pair of the client computing devices.

In the example of FIG. 4, the client device and source devices are each associated with spatial positions on the same two-dimensional plane within the virtual environment. It will be understood, however, that spatial positions associated with devices participating in the virtual environment may differ relative to three virtual dimensions—i.e., X, Y, and Z axes within the virtual environment. Thus, in some cases the difference attenuation values between the client device and various source devices may correspond to the distance between virtual three-dimensional positions of the client and source devices.

This is illustrated in more detail with respect to FIG. 3. Specifically, FIG. 3 includes a spatial position 300 depicted within a raised balcony area, and a different spatial position 302 shown on ground level near the balcony. Given this, in some cases a source attenuation value between the user computing devices corresponding to spatial positions 300 and 302 may account for the distance in height between the two devices (i.e., a distance along the Z axis), in addition to the distance between the devices along the plane of the floor (i.e., distances along the X and Y axes).

In the above example, the source attenuation values for a client device are based on distances between the client device and a plurality of source devices. Additionally, or alternatively, each source attenuation value of the plurality of source attenuation values may in some cases be based on a distance between a corresponding source device of the plurality of source devices and a virtual anchor in the virtual environment.

This is also illustrated with respect to FIG. 3, which includes spatial positions 304 and 306, each associated with different source devices participating in the virtual environment and transmitting audio streams to the collaboration computing device. FIG. 3 also depicts a virtual anchor 308, indicated by a box proximate to spatial positions 304 and 306. The virtual anchor 308 may be equated to a virtual microphone in the virtual environment. In other words, audio streams originating from source devices associated with spatial positions that are relatively closer to the virtual anchor 308 may be treated as having relatively higher intensity, just as would be the case for a human speaking near an active microphone in the real world. In other words, the source attenuation value associated with an audio stream originating from a device corresponding to spatial position 304 may result in relatively little attenuation of the audio stream, given that spatial position 304 is near the virtual anchor 308. In this manner, the audio stream originating from the device of spatial position 304 may be relatively more likely to be delivered to other user computing devices participating in the virtual environment, even if their own spatial positions are relatively far from position 304.

As another example, a virtual anchor may be used to calculate distances between multiple devices participating in the virtual environment that do not have information regarding their positions relative to one another, if each device has information regarding its position relative to the virtual anchor. In other words, each client device may receive, from each of the plurality of source devices, each source device's position relative to the virtual anchor. Because the position of the client device relative to the virtual anchor is also known, the client device is able to translate the positions of the plurality of source devices into a shared frame of reference, and thereby determine the relative distances between the client device and the plurality of source devices.

In some examples, each source attenuation value of the plurality of source attenuation values may also be based on one or more virtual acoustic factors associated with the virtual environment. Such virtual acoustic factors can include, as examples, the spatial geometry of the virtual environment, the presence of any virtual objects in the virtual environment, and the simulated effects of any virtual materials and surfaces within the virtual environment. For instance, in the real world, propagation of sound waves within a space will be affected by the shape and size of the space, the presence of objects within the space (e.g., people, furniture), and the nature of the materials from which the space is constructed. For example, sound waves propagate differently within a real room that has wood flooring, as compared to a room that has carpeting.

The simulated effects of such factors within the virtual environment may in some cases be considered by the user computing devices and/or collaboration computing device in generating the source attenuation values. For example, a user computing device may simulate propagation of its audio stream as a virtual sound wave within the virtual environment. Thus, for a client device and source device in a virtual environment that is simulated as having acoustically reflective surfaces (e.g., hardwood flooring), source attenuation values between the client and source devices may cause relatively less attenuation than source attenuation values generated for a different virtual environment that is simulated as having acoustically deadening materials (e.g., carpeting), for the same simulated difference in spatial positions.

As another example, source attenuation values may be calculated based on presence of audio occluding elements within the virtual environment, such as walls and doors. In an example scenario, one source device may be associated with a position within a virtual conference room, while a client device may be associated with a position in a virtual hallway outside the virtual conference room, where the conference room and hallway are connected by an open door. In this scenario, simply basing the source attenuation value on the straight-line distance between the source and client devices would ignore the impact of the walls and doorway on audio propagation. Thus, the source attenuation value for the source device may optionally be calculated by modeling the source's audio stream as a soundwave that travels from within the conference room, through the open door, and down the hallway to the client. In other words, the source attenuation value is proportional to the sum of the distances between the source device and the open door, and the client device and the open door, rather than simply the straight-line distance between the source and client devices.

Furthermore, in some examples, the collaboration computing device can adjust the effective position associated with a source device within the virtual environment to coincide with a client device's position. This has the effect of ignoring any attenuation that would otherwise be applied based on the actual distance between the client and source devices in the virtual environment. For example, this can be used to provide a "broadcast-like" effect, allowing a speaker to address multiple participants (e.g., a crowd of listeners) with substantially the same volume, regardless of the respective distances between the speaker and each participant.

Returning to FIG. 1, the first user computing device 102 transmits its source attenuation map 134 to the collaboration computing device 100, with the source attenuation map including a plurality of source attenuation values 138 each associated with a different source device. The collaboration computing device 100 therefore accesses a different collection of source attenuation values for each client device, where each source attenuation value is associated with a different source device of the plurality of source devices. Though not shown in FIG. 1, it will be understood that second user computing device 104 as well as any other user computing devices in the virtual environment similarly transmit source attenuation maps to the collaboration computing device. As discussed above, in some examples, accessing a plurality of source attenuation values may include receiving the plurality of source attenuation values from a client device. Additionally, or alternatively, any or all of the source attenuation values may be calculated by the collaboration computing device.

Turning now to collaboration computing device 100, the device includes a processor 140 and a memory 142. Processor 140 may be configured to implement various computing functions by executing instructions held by memory 142, and/or other data storage media of the collaboration computing device. Processor 140 may take the form of any suitable computer logic componentry. In one example, processor 140 may be implemented as logic subsystem 1002 described below with respect to FIG. 10. Similarly, memory 142 may take the form of any suitable volatile or non-volatile computer storage medium. Memory 142 may be implemented as storage subsystem 1010 described below with respect to FIG. 10.

Via memory 142, the collaboration computing device stores a source list 144 that includes identifiers for each of the plurality of source devices transmitting audio streams to the collaboration computing device. As shown, the source list includes a plurality of source attenuation maps 146 that each correspond to one of the plurality of source devices. Just as with source attenuation map 134, each source attenuation map may include a plurality of source attenuation values between a user computing device corresponding to the source attenuation map, and the other user computing devices participating in the virtual environment.

After receiving the plurality of audio streams from the plurality of user computing devices, the collaboration computing device 100 accesses, for each audio stream, a source audio energy value at the source device that transmitted the audio stream. In some examples, accessing the source audio energy value at the source device that transmitted the audio stream comprises receiving the source audio energy value from the source device. As noted above, in some examples the source audio energy value can be a source root-mean-square (SRMS) value that is calculated by the source device that transmitted the audio stream.

For example, first user computing device 102 includes an audio level calculator 148 configured to calculate per-frame SRMS values for audio stream 118 output by the first user computing device. As shown, the audio level calculator outputs SRMS value 150, which is transmitted to the collaboration computing device over network 106. Accordingly, and in one potential advantage of the present disclosure, in these examples the computational resources for determining the SRMS values are provided by each user computing device, as opposed to dedicating resources of the collaboration computing device 100 to these tasks. In this manner, and by offloading such per-frame RMS computations to each client, the computational burdens on the collaboration computing device 100 are reduced. Additionally, this configuration provides increasing computational resource savings as the number of user computing devices producing audio streams also increases. In other examples, the SRMS values may be calculated by the collaboration computing device.

Any suitable method for calculating an SRMS value may be used—for example, audio streams are often recorded as a plurality of discrete samples. The amplitude of each sample may be squared, then each of the squared amplitudes may be averaged. The SRMS value of the audio stream may then be determined by finding the square root of the average squared sample amplitudes, giving the average intensity of the audio stream over a given window of time.

In other examples, the SRMS value for the audio stream may be determined in other suitable ways, and in some cases may be calculated at the collaboration computing device 100 after receiving the audio stream.

In any case, the collaboration computing device 100 accesses the SRMS values for each of the audio streams 132, such as from memory 142. The SRMS values for each audio stream may be sorted in a list by the source ID of the user computing device that transmitted the audio stream. This is illustrated with respect to FIG. 5, showing an example list 500 of SRMS values (e.g., source audio energy values). As shown, list 500 includes the source ID for each of the user computing devices and an SRMS value corresponding to the audio stream transmitted by that source device. In this example, the SRMS values range between 1.3 dB and 9.4 dB. It will be understood, however, that these example values are non-limiting, and that SRMS values may have any suitable range and magnitude.

Returning to FIG. 1, after accessing the SRMS value for each audio stream, the collaboration computing device computes, for each client device, a set of client-centric audio energy values. Specifically, in FIG. 1, collaboration computing device 100 maintains a set of client-centric audio energy values 152 in memory 142. As discussed above, a client-centric audio energy value can be described as the effective intensity of an audio stream originating from a source device and received by the client device, based on the original intensity of the audio stream at the source device and accounting for the distance between spatial positions corresponding to the source and client devices in the virtual environment. Thus, for any given client device, the collaboration computing device computes a client-centric audio energy value for each audio stream of the plurality of audio streams by modifying the SRMS value of each audio stream using a corresponding source attenuation value that is associated with the source device that transmitted the audio stream.

The client-centric audio energy values may be computed in any suitable way. In some examples, computing a client-centric audio energy value for an audio stream comprises multiplying a corresponding SRMS value by the source attenuation value associated with the source device that transmitted the audio stream. This is illustrated in FIG. 6, showing a list 600 of client-centric audio energy values (AEV) calculated for a particular client device, again having a source ID of S3 or "source 3." Specifically, as shown, the client-centric audio energy value for each source ID is calculated by multiplying the SRMS value of the source ID by a corresponding source attenuation value. Again, the specific values shown in FIG. 6 are non-limiting examples. It will be understood that, in other examples, other suitable values may be used.

As discussed above, source attenuation values may in some examples have magnitudes between zero and one. Thus, relatively smaller source attenuation values will, when multiplied by an SRMS value, result in relatively more attenuation of the intensity of the audio stream. In other examples, however, SRMS values may be modified using source attenuation values in other suitable ways, depending on how the source attenuation values are calculated and expressed.

After generating a plurality of client-centric audio energy values 152 for a particular client device, the collaboration computing device 100 generates a source prioritization list by sorting at least a portion of the plurality of source devices by their client-centric audio energy values. This is schematically shown in FIG. 1, as collaboration computing device 100 maintains a set of source prioritization lists 154 for each of the plurality of user computing devices.

In some examples, sorting the plurality of source devices by their client-centric audio energy values comprises sorting the plurality of source devices from a highest client-centric audio energy value to a lowest client-centric audio energy value. Thus, the source prioritization list for each client device will effectively list a plurality of audio streams arranged from highest intensity to lowest intensity, accounting for distance attenuation. In other examples, the source prioritization list may be sorted in other suitable ways—e.g., from lowest to highest, or by source ID.

After the source prioritization list for a particular client device is generated, the collaboration computing device selects a subset of audio streams from the source prioritization list. The subset of audio streams are then delivered to the client device. From there, the client device may render the audio streams for a human user. This is schematically illustrated with respect to FIG. 1. As shown, the collaboration computing device 100 delivers a subset 156 of selected audio streams to the first user computing device 102. Such audio streams may then be rendered via an electroacoustic transducer 158 of the first user computing device, such as a speaker, headphones, earbuds, or other suitable playback device. It will be understood that a different subset of audio streams may selected for delivery to second user computing device 104, as well as any other user computing devices participating in the virtual environment. In this manner, and in another potential advantage of the present disclosure, the collaboration computing device 100 provides a listener-centric experience by selecting per-listener, prioritized subsets of the audio streams for delivery to each user computing device. Second user computing device 104 also includes an electroacoustic transducer 160 for playback of the audio streams delivered to the second user computing device.

In some cases, when rendering two or more simultaneous audio streams, a user computing device may be configured to use suitable audio spatialization techniques to improve the auditory separation between the audio streams. In other words, the audio streams may be rendered to give an impression that the audio streams are arriving at the listener's ears from different directions, rather than simply mixing the audio streams together into a single monoaural stream. In some cases, user computing devices having relatively higher processing capabilities can use relatively more robust spatializing techniques than user computing devices with relatively lesser processing capabilities.

FIG. 7 shows an example subset 700 of selected audio streams. In this example, the subset of audio streams includes five different audio streams, corresponding to five different source devices. In other examples, however, other suitable numbers of audio streams may be selected for inclusion in the subset of audio streams. Notably, one of the audio streams included as part of subset 700 is marked with an asterisk to indicate that the audio stream is selected by the collaboration computing device after overriding the client device's preferences. For example, subset 700 may include the four audio streams having highest client-centric audio energy values and a fifth audio stream that would not ordinarily be included, but was nonetheless selected by the collaboration computing device. This selected audio stream may, for example, correspond to a speaker who should be heard by all participants, regardless of their virtual distances away from the speaker—e.g., a presenter or broadcaster.

In some examples, selecting the subset of audio streams from the source prioritization list comprises selecting a predetermined number of the audio streams having the highest client-centric audio energy values. In other words, the collaboration computing device may be programmed to always select the five audio streams having highest client-centric audio energy values, as one example.

In some examples, the number of audio streams selected for inclusion in the subset can be determined based on one or more criterion. For instance, in some examples the number of audio streams delivered to any particular client device is based on the current capabilities of the client device—e.g., accounting for the client device's processing capabilities and/or current network bandwidth availability. As discussed above, different types of computing devices may have different hardware configurations and may be present in environments having different network conditions. Some user computing devices, such as those including relatively powerful processing hardware (e.g., desktop computers, mixed reality devices), may be capable of receiving and rendering more simultaneous audio streams than computing devices having relatively weaker processing hardware (e.g., smartphones, tablets). Thus, each client device may determine how many audio streams it is currently capable of receiving, and transmit such information to the collaboration computing device.

This is schematically illustrated in FIG. 1, as first user computing device 102 transmits a client device capabilities value 162 over network 106. In other words, the collaboration computing device 100 receives, from the client device, a client device capabilities value that indicates a current processing capability of the client device, and/or a current network bandwidth availability of the client device. As such, selecting the subset of audio streams from the source prioritization list 154 comprises using the client device capabilities value 162 to select a number of the audio streams from the source prioritization list having highest client-centric energy values. The client capabilities value may take any suitable form and need not include a single concrete value. Rather, in some cases, the client capabilities value may include a set of metadata—e.g., indicating the current processing capabilities and available network bandwidth of the user computing device.

Each user computing device may determine its own availability for receiving audio streams, and thus generate its own client device capability value, in any suitable way. As one example, where first user computing device 102 has relatively powerful hardware and processing capabilities, the client device capabilities value 162 will reflect such capabilities and a relatively larger number of audio streams will be selected for delivery to the device, such as 50. By contrast, where second user computing device 104 has less powerful hardware and processing capabilities, such as a smartphone, its client device capabilities value will reflect such capabilities and a relatively smaller number of audio streams will be selected for delivery, such as 5.

The present disclosure has thus far focused on audio streams originating from user computing devices participating in a virtual environment. In some cases, however, each client computing device may additionally receive one or more audio streams originating from other sources. For example, the virtual environment may be populated with one or more non-human audio sources that do not correspond to user computing devices, such as non-player characters in a video game. In any case, such non-human audio sources may each be associated with spatial positions within the virtual environment, as with the plurality of user computing devices. Thus, just as with audio streams originating from user computing devices, a client computing device may generate source attenuation values for each non-human audio source, and transmit such source attenuation values to the collaboration computing device. From there, the collaboration computing device may perform a similar process to the one described above, for the purpose of determining whether any of the non-human audio streams should be included in the subset of audio streams delivered to the client device. In other words, the collaboration computing device may modify the SRMS value for each non-human audio source with a corresponding source attenuation value, and sort the resulting client-centric audio energy value in a source prioritization list for the client device.

Additionally, or alternatively, the audio streams delivered to any particular client device may include a room tone audio stream that simulates background noise of the virtual environment. Such a room tone audio stream may increase the sense of immersion experienced by users participating in the virtual environment by more effectively simulating background noise that would be present in a real room. In FIG. 1, the collaboration computing device includes a room tone generator 163 that generates a room tone audio stream 164 for transmission to the first user computing device. The collaboration computing device may transmit the same or a different room tone audio stream to second user computing device 104, as well as any other user computing devices participating in the virtual environment.

A room tone audio stream may be generated in any suitable way. In one example, the room tone audio stream may be generated by mixing at least a portion of the audio streams of the plurality of audio streams transmitted to the collaboration computing device from the plurality of user computing devices. This can improve the sense of immersion experienced by users in the virtual environment by emulating audio that would be experienced in a real room, in which various conversations being held across the room may still be audible even if the individual words cannot be distinguished. In other examples, however, the room tone audio stream may be a pre-generated audio track that is not based on, or is otherwise generated independently from, the plurality of audio streams. For example, the room tone audio stream may be a stock audio sample consistent with quiet conversation, cheering, applause, laughter, etc.

Figure 8A:
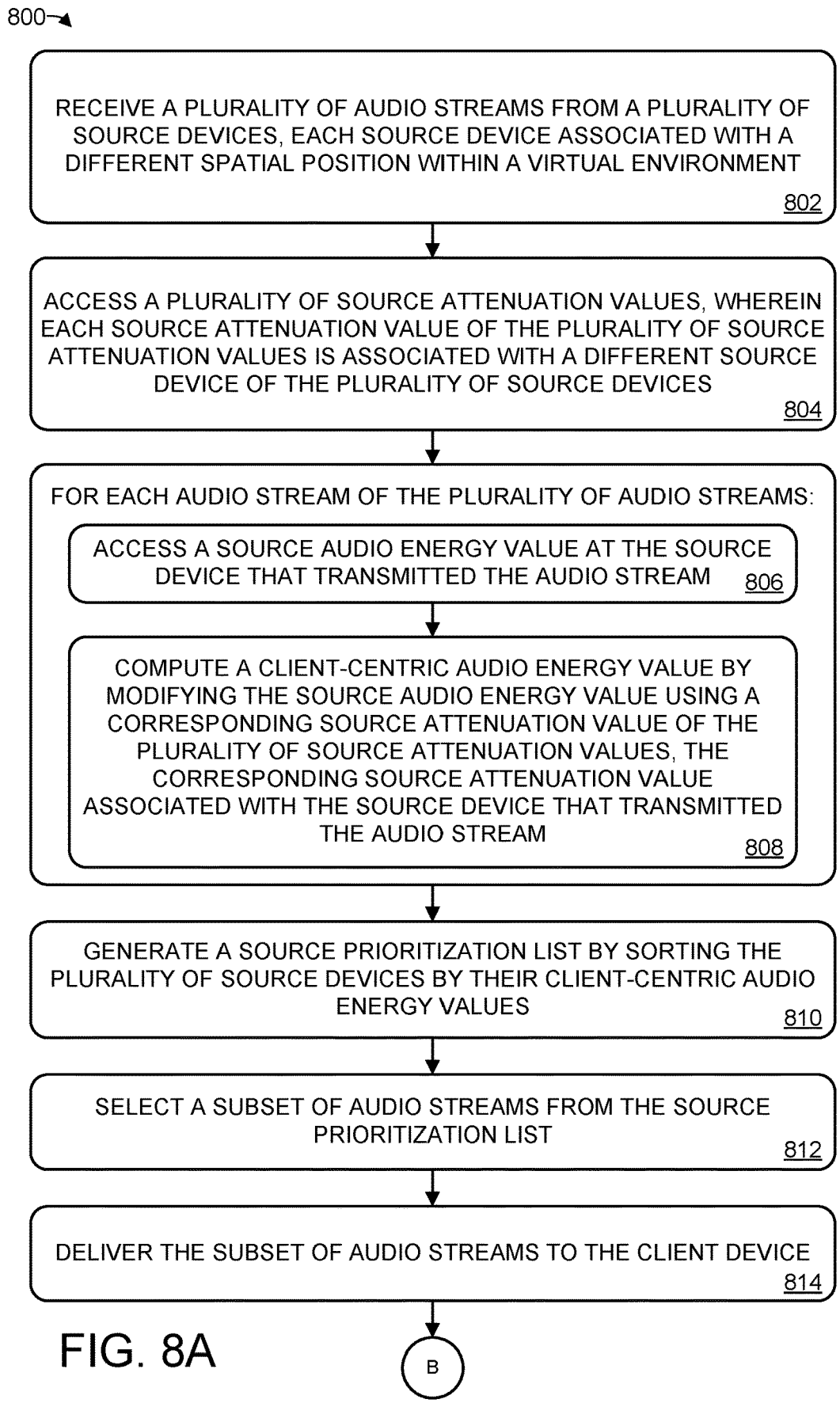
Figure 8C:
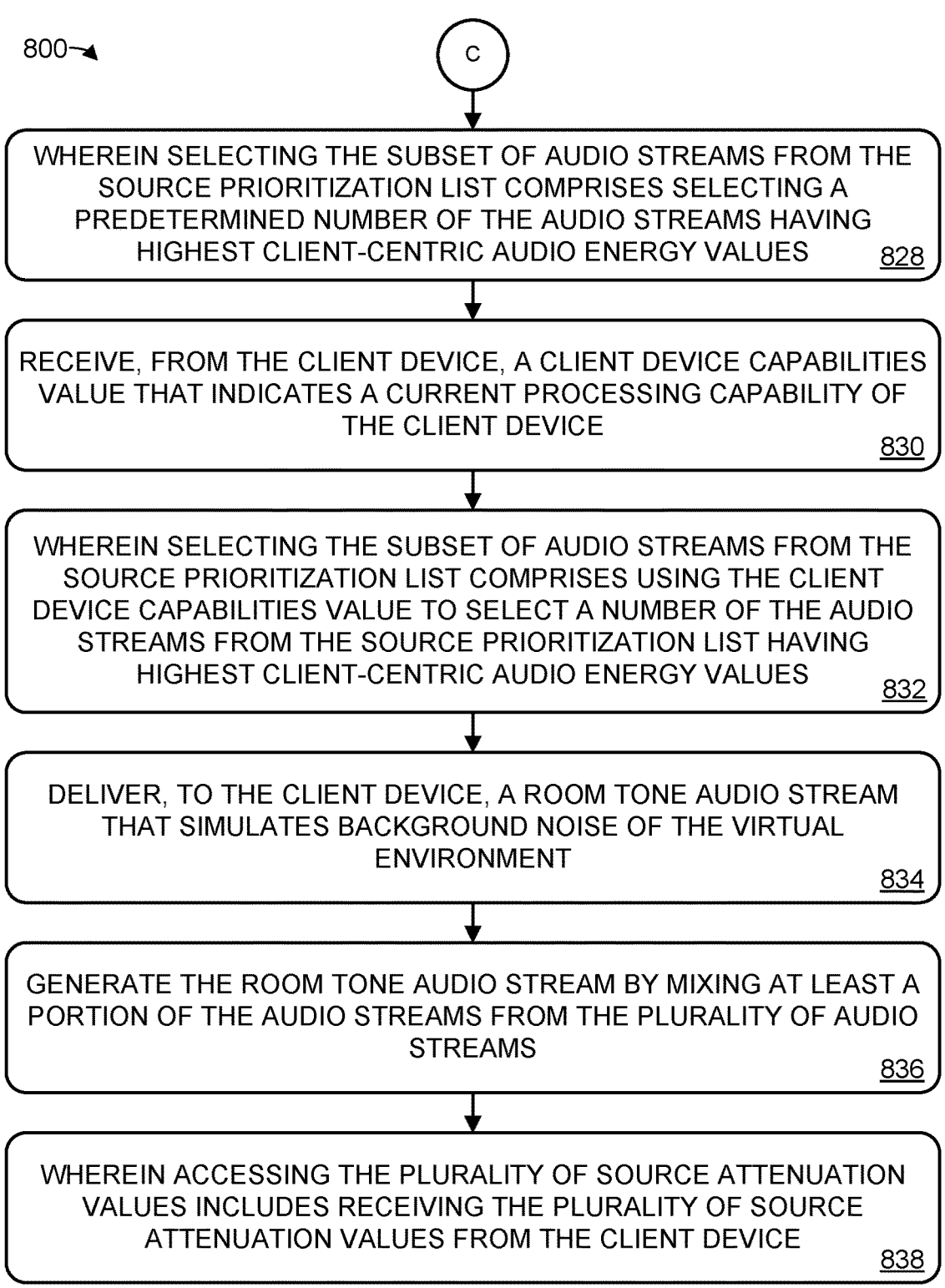

With reference now to FIGS. 8A-8C, a flow diagram is illustrated depicting an example method 800 for selecting a subset of audio streams from a plurality of audio streams for delivery to a client device. The following description of method 800 is provided with reference to the software and hardware components described herein and shown in FIGS. 1-7 and 10. For example, the method 800 may be performed by collaboration computing device 100, first user computing device 102, second user computing device 104, mixed reality device 204, the user computing devices associated with any of the spatial positions depicted in FIGS. 2B, 3, and 4, the computing system 1000, or a suitable combination of components described herein.

It will be appreciated that the following description of method 800 is provided by way of example and is not meant to be limiting. Therefore, it is to be understood that method 800 may include additional and/or alternative steps relative to those illustrated in FIGS. 8A-8C. Further, it is to be understood that the steps of method 800 may be performed in any suitable order. Further still, it is to be understood that one or more steps may be omitted from method 800 without departing from the scope of this disclosure. It will also be appreciated that method 800 also may be performed in other contexts using other suitable components.

With reference to FIG. 8A, at 802, the method 800 includes receiving a plurality of audio streams from a plurality of source devices, each source device associated with a different spatial position within a virtual environment. At 804, the method 800 includes accessing a plurality of source attenuation values, wherein each source attenuation value of the plurality of source attenuation values is associated with a different source device of the plurality of source devices. At 806, the method 800 includes, for each audio stream of the plurality of audio streams, accessing a source audio energy value at the source device that transmitted the audio stream. At 808, the method 800 includes, for each audio stream of the plurality of audio streams, computing a client-centric audio energy value by modifying the source audio energy value using a corresponding source attenuation value of the plurality of source attenuation values, the corresponding source attenuation value associated with the source device that transmitted the audio stream. At 810, the method 800 includes generating a source prioritization list by sorting the plurality of source devices by their client-centric audio energy values. At 812, the method 800 includes selecting the subset of audio streams from the source prioritization list. At 814, the method 800 includes delivering the subset of audio streams to the client device.

With reference now to FIG. 8B, at 816 the method 800 includes wherein each source attenuation value of the plurality of source attenuation values is based on a distance in the virtual environment between a client device spatial position associated with the client device and a source device spatial position associated with a corresponding source device of the plurality of source devices. At 818, the method 800 includes wherein each source attenuation value of the plurality of source attenuation values is also based on one or more virtual acoustic factors associated with the virtual environment. At 820, the method 800 includes wherein each source attenuation value of the plurality of source attenuation values is based on a distance between a corresponding source device of the plurality of source devices and a virtual anchor in the virtual environment. At 822, the method 800 includes wherein the source audio energy value is a source root-mean-square (SRMS) value and accessing the source audio energy value further comprises receiving the SRMS value from the source device that transmitted the audio stream. At 824, the method 800 includes wherein computing the client-centric audio energy value comprises multiplying the source audio energy value by the source attenuation value associated with the source device that transmitted the audio stream. At 826, the method 800 includes wherein sorting the plurality of source devices by their client-centric audio energy values comprises sorting the plurality of source devices from a highest client-centric audio energy value to a lowest client-centric audio energy value.

With reference now to FIG. 8C, at 828 the method 800 includes wherein selecting the subset of audio streams from the source prioritization list comprises selecting a predetermined number of the audio streams having highest client-centric audio energy values. At 830, the method 800 includes receiving, from the client device, a client device capabilities value that indicates a current processing capability of the client device. At 832, the method 800 includes wherein selecting the subset of audio streams from the source prioritization list comprises using the client device capabilities value to select a number of the audio streams from the source prioritization list having highest client-centric audio energy values. At 834, the method 800 includes delivering, to the client device, a room tone audio stream that simulates background noise of the virtual environment. At 836, the method 800 includes generating the room tone audio stream by mixing at least a portion of the audio streams from the plurality of audio streams. At 838, the method 800 includes wherein accessing the plurality of source attenuation values includes receiving the plurality of source attenuation values from the client device.

With reference now to FIG. 9, a flow diagram is illustrated depicting an example method 900 for delivering different subsets of audio streams from a plurality of audio streams to client computing devices. The following description of method 900 is provided with reference to the software and hardware components described herein and shown in FIGS. 1-7 and 10. For example, the method 900 may be performed by collaboration computing device 100, first user computing device 102, second user computing device 104, mixed reality device 204, the user computing devices associated with any of the spatial positions depicted in FIGS. 2B, 3, and 4, computing system 1000, or a suitable combination of components described herein.

It will be appreciated that the following description of method 900 is provided by way of example and is not meant to be limiting. Therefore, it is to be understood that method 900 may include additional and/or alternative steps relative to those illustrated in FIG. 9. Further, it is to be understood that the steps of method 900 may be performed in any suitable order. Further still, it is to be understood that one or more steps may be omitted from method 900 without departing from the scope of this disclosure. It will also be appreciated that method 900 also may be performed in other contexts using other suitable components.

At 902, the method 900 includes receiving one audio stream of the plurality of audio streams from each client computing device of the client computing devices, each client computing device associated with a different spatial position within a virtual environment. At 904, the method 900 includes accessing a plurality of source attenuation values for each of the client computing devices, wherein each source attenuation value of the plurality of source attenuation values represents a distance in the virtual environment between a pair of the client computing devices. At 906, the method 900 includes, for each audio stream of the plurality of audio streams, accessing a source audio energy value at the client computing device that transmitted the audio stream. At 908, the method 900 includes, for each audio stream of the plurality of audio streams, computing a client-centric audio energy value by modifying the source audio energy value using a corresponding source attenuation value of the plurality of source attenuation values, the corresponding source attenuation value associated with the client computing device that transmitted the audio stream. At 910, the method 900 includes, for each client computing device, generating a source prioritization list by sorting at least a portion of the plurality of client computing devices by their client-centric audio energy values. At 912, the method 900 includes, for each client computing device, selecting a subset of audio streams from the source prioritization list. At 914, the method 900 includes, for each client computing device, delivering the subset of audio streams to the client computing device.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
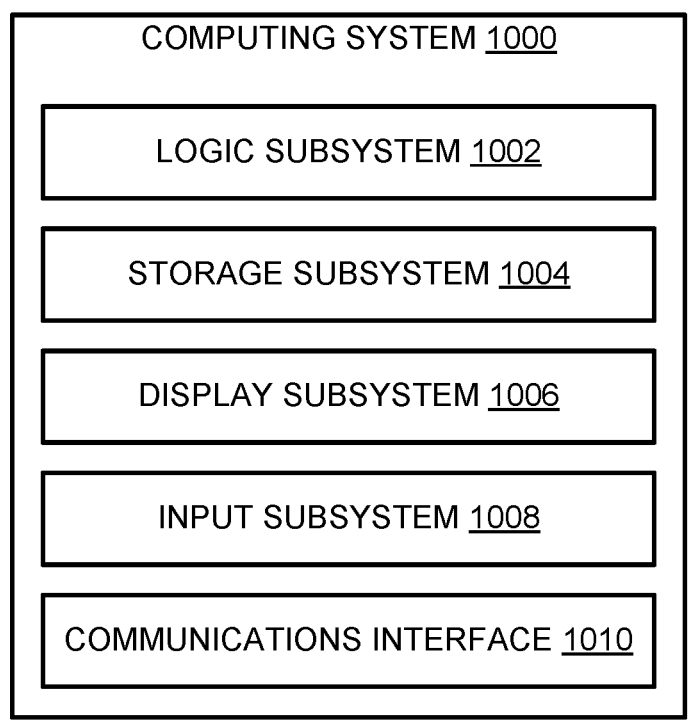
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, at a collaboration computing device, a method for selecting a subset of audio streams from a plurality of audio streams for delivery to a client device comprises: receiving the plurality of audio streams from a plurality of source devices, each source device associated with a different spatial position within a virtual environment; accessing a plurality of source attenuation values, wherein each source attenuation value of the plurality of source attenuation values is associated with a different source device of the plurality of source devices; for each audio stream of the plurality of audio streams: accessing a source audio energy value at the source device that transmitted the audio stream; and computing a client-centric audio energy value by modifying the source audio energy value using a corresponding source attenuation value of the plurality of source attenuation values, the corresponding source attenuation value associated with the source device that transmitted the audio stream; generating a source prioritization list by sorting the plurality of source devices by their client-centric audio energy values; selecting the subset of audio streams from the source prioritization list; and delivering the subset of audio streams to the client device. In this example or any other example, each source attenuation value of the plurality of source attenuation values is based on a distance in the virtual environment between a client device spatial position associated with the client device and a source device spatial position associated with a corresponding source device of the plurality of source devices. In this example or any other example, each source attenuation value of the plurality of source attenuation values is also based on one or more virtual acoustic factors associated with the virtual environment. In this example or any other example, each source attenuation value of the plurality of source attenuation values is based on a distance between a corresponding source device of the plurality of source devices and a virtual anchor in the virtual environment. In this example or any other example, the source audio energy value is a source root-mean-square (SRMS) value, and accessing the source audio energy value further comprises receiving the SRMS value from the source device that transmitted the audio stream. In this example or any other example, computing the client-centric audio energy value comprises multiplying the source audio energy value by the source attenuation value associated with the source device that transmitted the audio stream. In this example or any other example, sorting the plurality of source devices by their client-centric audio energy values comprises sorting the plurality of source devices from a highest client-centric audio energy value to a lowest client-centric audio energy value. In this example or any other example, selecting the subset of audio streams from the source prioritization list comprises selecting a predetermined number of the audio streams having highest client-centric audio energy values. In this example or any other example, the method further comprises: receiving, from the client device, a client device capabilities value that indicates a current processing capability of the client device; and wherein selecting the subset of audio streams from the source prioritization list comprises using the client device capabilities value to select a number of the audio streams from the source prioritization list having highest client-centric audio energy values. In this example or any other example, the method further comprises delivering, to the client device, a room tone audio stream that simulates background noise of the virtual environment. In this example or any other example, the method further comprises generating the room tone audio stream by mixing at least a portion of the audio streams from the plurality of audio streams. In this example or any other example, accessing the plurality of source attenuation values includes receiving the plurality of source attenuation values from the client device.

In an example, a collaboration computing device comprises: a logic machine; and a storage machine holding instructions executable by the logic machine to: receive a plurality of audio streams from a plurality of source devices, each source device associated with a different spatial position within a virtual environment; access a plurality of source attenuation values, wherein each source attenuation value of the plurality of source attenuation values is associated with a different source device of the plurality of source devices; for each audio stream of the plurality of audio streams: access a source audio energy value at the source device that transmitted the audio stream; and compute a client-centric audio energy value by modifying the source audio energy value using a corresponding source attenuation value of the plurality of source attenuation values, the corresponding source attenuation value associated with the source device that transmitted the audio stream; generate a source prioritization list by sorting the plurality of source devices by their client-centric audio energy values; select the subset of audio streams from the source prioritization list; and deliver the subset of audio streams to the client device. In this example or any other example, each source attenuation value of the plurality of source attenuation values is based on a distance in the virtual environment between a client device spatial position associated with the client device and a source device spatial position associated with a corresponding source device of the plurality of source devices. In this example or any other example, each source attenuation value of the plurality of source attenuation values is based on a distance between a corresponding source device of the plurality of source devices and a virtual anchor in the virtual environment. In this example or any other example, computing the client-centric audio energy value comprises multiplying the source audio energy value by the source attenuation value associated with the source device that transmitted the audio stream. In this example or any other example, sorting the plurality of source devices by their client-centric audio energy values comprises sorting the plurality of source devices from a highest client-centric audio energy value to a lowest client-centric audio energy value. In this example or any other example, the instructions are further executable to: receive, from the client device, a client device capabilities value that indicates a current processing capability of the client device; and wherein selecting the subset of audio streams from the source prioritization list comprises using the client device capabilities value to select a number of the audio streams from the source prioritization list having highest client-centric audio energy values. In this example or any other example, accessing the plurality of source attenuation values includes receiving the plurality of source attenuation values from the client device.

In an example, at a collaboration computing device, a method for delivering different subsets of audio streams from a plurality of audio streams to client computing devices comprises: receiving one audio stream of the plurality of audio streams from each client computing device of the client computing devices, each client computing device associated with a different spatial position within a virtual environment; calculating a plurality of source attenuation values for each of the client computing devices, wherein each source attenuation value of the plurality of source attenuation values represents a distance in the virtual environment between a pair of the client computing devices; for each audio stream of the plurality of audio streams: accessing a source audio energy value at the client computing device that transmitted the audio stream; and computing a client-centric audio energy value by modifying the source audio energy value using a corresponding source attenuation value of the plurality of source attenuation values, the corresponding source attenuation value associated with the client computing device that transmitted the audio stream; and for each client computing device of the plurality of client computing devices: generating a source prioritization list by sorting at least a portion of the plurality of client computing devices by their client-centric audio energy values; selecting a subset of audio streams from the source prioritization list; and delivering the subset of audio streams to the client computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a collaboration computing device, a method for selecting a subset of audio streams from a plurality of audio streams for delivery to a client device, the method comprising:

receiving the plurality of audio streams from a plurality of source devices, each source device associated with a different spatial position within a virtual environment;

accessing a plurality of source attenuation values, wherein each source attenuation value of the plurality of source attenuation values is associated with a different source device of the plurality of source devices;

for each audio stream of the plurality of audio streams:
 accessing a source audio energy value at the source device that transmitted the audio stream; and
 computing a client-centric audio energy value by modifying the source audio energy value using a corresponding source attenuation value of the plurality of source attenuation values, the corresponding source attenuation value associated with the source device that transmitted the audio stream;

for at least one audio stream of the plurality of audio streams, adjusting its corresponding source attenuation value to equate its client-centric audio energy value to its source audio energy value;

generating a source prioritization list by sorting the plurality of source devices by their client-centric audio energy values;
selecting the subset of audio streams from the source prioritization list; and
delivering the subset of audio streams to the client device.

2. The method of claim 1, wherein each source attenuation value of the plurality of source attenuation values is based on a distance in the virtual environment between the client device spatial position associated with the client device and a source device spatial position associated with a corresponding source device of the plurality of source devices.

3. The method of claim 2, wherein each source attenuation value of the plurality of source attenuation values is also based on one or more virtual acoustic factors associated with the virtual environment.

4. The method of claim 1, wherein each source attenuation value of the plurality of source attenuation values is based on a distance between a corresponding source device of the plurality of source devices and a virtual anchor in the virtual environment.

5. The method of claim 1, wherein the source audio energy value is a source root-mean-square (SRMS) value, and accessing the source audio energy value further comprises receiving the SRMS value from the source device that transmitted the audio stream.

6. The method of claim 1, wherein computing the client-centric audio energy value comprises multiplying the source audio energy value by the source attenuation value associated with the source device that transmitted the audio stream.

7. The method of claim 1, wherein sorting the plurality of source devices by their client-centric audio energy values comprises sorting the plurality of source devices from a highest client-centric audio energy value to a lowest client-centric audio energy value.

8. The method of claim 7, wherein selecting the subset of audio streams from the source prioritization list comprises selecting a predetermined number of the audio streams having highest client-centric audio energy values.

9. The method of claim 7, further comprising:
receiving, from the client device, a client device capabilities value that indicates a current processing capability of the client device; and
wherein selecting the subset of audio streams from the source prioritization list comprises using the client device capabilities value to select a number of the audio streams from the source prioritization list having highest client-centric audio energy values.

10. The method of claim 1, further comprising delivering, to the client device, a room tone audio stream that simulates background noise of the virtual environment.

11. The method of claim 10, further comprising generating the room tone audio stream by mixing at least a portion of the audio streams from the plurality of audio streams.

12. The method of claim 1, wherein accessing the plurality of source attenuation values includes receiving the plurality of source attenuation values from the client device.

13. A collaboration computing device, comprising:
a logic machine; and
a storage machine holding instructions executable by the logic machine to:
receive a plurality of audio streams from a plurality of source devices, each source device associated with a different spatial position within a virtual environment;
access a plurality of source attenuation values, wherein each source attenuation value of the plurality of source attenuation values is associated with a different source device of the plurality of source devices;
for each audio stream of the plurality of audio streams:
access a source audio energy value at the source device that transmitted the audio stream; and
compute a client-centric audio energy value by modifying the source audio energy value using a corresponding source attenuation value of the plurality of source attenuation values, the corresponding source attenuation value associated with the source device that transmitted the audio stream;
for at least one audio stream of the plurality of audio streams, adjust its corresponding source attenuation value to equate its client-centric audio energy value to its source audio energy value;
generate a source prioritization list by sorting the plurality of source devices by their client-centric audio energy values;
select the subset of audio streams from the source prioritization list; and
deliver the subset of audio streams to a client device.

14. The collaboration computing device of claim 13, wherein each source attenuation value of the plurality of source attenuation values is based on a distance in the virtual environment between a client device spatial position associated with the client device and a source device spatial position associated with a corresponding source device of the plurality of source devices.

15. The collaboration computing device of claim 13, wherein each source attenuation value of the plurality of source attenuation values is based on a distance between a corresponding source device of the plurality of source devices and a virtual anchor in the virtual environment.

16. The collaboration computing device of claim 13, wherein computing the client-centric audio energy value comprises multiplying the source audio energy value by the source attenuation value associated with the source device that transmitted the audio stream.

17. The collaboration computing device of claim 13, wherein sorting the plurality of source devices by their client-centric audio energy values comprises sorting the plurality of source devices from a highest client-centric audio energy value to a lowest client-centric audio energy value.

18. The collaboration computing device of claim 13, wherein the instructions are further executable to:
receive, from the client device, a client device capabilities value that indicates a current processing capability of the client device; and
wherein selecting the subset of audio streams from the source prioritization list comprises using the client device capabilities value to select a number of the audio streams from the source prioritization list having highest client-centric audio energy values.

19. The collaboration computing device of claim 13, wherein accessing the plurality of source attenuation values includes receiving the plurality of source attenuation values from the client device.

20. At a collaboration computing device, a method for delivering different subsets of audio streams from a plurality of audio streams to client computing devices, the method comprising:
receiving one audio stream of the plurality of audio streams from each client computing device of the client computing devices, each client computing device associated with a different spatial position within a virtual environment;
accessing a plurality of source attenuation values for each of the client computing devices, wherein each source attenuation value of the plurality of source attenuation values represents a distance in the virtual environment between a pair of the client computing devices;
for each audio stream of the plurality of audio streams:
  accessing a source audio energy value at the client computing device that transmitted the audio stream; and
  computing a client-centric audio energy value by modifying the source audio energy value using a corresponding source attenuation value of the plurality of source attenuation values, the corresponding source attenuation value associated with the client computing device that transmitted the audio stream;
for each client computing device of the plurality of client computing devices:
  generating a source prioritization list by sorting at least a portion of the plurality of client computing devices by their client-centric audio energy values;
  selecting a subset of audio streams from the source prioritization list; and
  delivering the subset of audio streams to the client computing device; and
for at least one audio stream of the plurality of audio streams, adjusting its corresponding source attenuation value to equate its client-centric audio energy value to its source audio energy value.

* * * * *